US008139067B2

(12) United States Patent
Anguelov et al.

(10) Patent No.: US 8,139,067 B2
(45) Date of Patent: Mar. 20, 2012

(54) SHAPE COMPLETION, ANIMATION AND MARKER-LESS MOTION CAPTURE OF PEOPLE, ANIMALS OR CHARACTERS

(75) Inventors: Dragomir D. Anguelov, San Francisco, CA (US); Praveen Srinivasan, Philadelphia, PA (US); Daphne Koller, Stanford, CA (US); Sebastian Thrun, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 885 days.

(21) Appl. No.: 11/881,172

(22) Filed: Jul. 25, 2007

(65) Prior Publication Data

US 2008/0180448 A1    Jul. 31, 2008

Related U.S. Application Data

(60) Provisional application No. 60/833,549, filed on Jul. 25, 2006.

(51) Int. Cl.
*G06T 13/00* (2011.01)

(52) U.S. Cl. ........ 345/473; 345/419; 345/472; 345/474; 345/475; 345/952

(58) Field of Classification Search .......... 345/473–475, 345/581–589; 382/103, 115–127; 385/154, 385/190–208; 600/595
See application file for complete search history.

(56) References Cited

U.S. PATENT DOCUMENTS

| | | | | |
|---|---|---|---|---|
| 6,047,078 A | * | 4/2000 | Kang | 382/107 |
| 6,552,729 B1 | * | 4/2003 | Di Bernardo et al. | 345/473 |
| 2003/0164829 A1 | * | 9/2003 | Bregler et al. | 345/474 |
| 2003/0169907 A1 | * | 9/2003 | Edwards et al. | 382/118 |
| 2003/0208116 A1 | * | 11/2003 | Liang et al. | 600/407 |
| 2003/0215130 A1 | * | 11/2003 | Nakamura et al. | 382/154 |
| 2004/0021660 A1 | * | 2/2004 | Ng-Thow-Hing et al. | 345/419 |
| 2006/0267978 A1 | * | 11/2006 | Litke et al. | 345/419 |

OTHER PUBLICATIONS

Mohr, A. and Gleicher, M., 2003. Building efficient, accurate character skins from examples. ACM Transactions on Graphics, 22 (3), 562-568.

Noh, J., and Neumann, U., 2001. Expression cloning. Proceedings of ACM SIGGRAPH 2001, 277-288.

(Continued)

*Primary Examiner* — Andrew Wang
*Assistant Examiner* — Abderrahim Merouan
(74) *Attorney, Agent, or Firm* — Lumen Patent Firm

(57) ABSTRACT

Motion capture animation, shape completion and markerless motion capture methods are provided. A pose deformation space model encoding variability in pose is learnt from a three-dimensional (3D) dataset. Body shape deformation space model encoding variability in pose and shape is learnt from another 3D dataset. The learnt pose model is combined with the learnt body shape model. For motion capture animation, given parameter set, the combined model generates a 3D shape surface of a body in a pose and shape. For shape completion, given partial surface of a body defined as 3D points, the combined model generates a 3D surface model in the combined spaces that fits the 3D points. For markerless motion capture, given 3D information of a body, the combined model traces the movement of the body using the combined spaces that fits the 3D information or reconstructing the body's shape or deformations that fits the 3D information.

35 Claims, 8 Drawing Sheets

(5 of 8 Drawing Sheet(s) Filed in Color)

OTHER PUBLICATIONS

Grochow, K., Martin, S. L., Hertzmann, A., and Popovic, Z ., 2004. Style based inverse kinematics. ACM Transactions on Graphics, 22(3), 522-531.

Sand, P., McMillan, L., and Popovic, Z. 2003. Continuus capture of skin deformation. ACM Transaction on Graphcs, 22( 3) 578-586.

Smola, A. and Scholkopf, B., 2003. A tutorial on support vector regression. NeuroCOLT Technical Report TR-98-030, 2003.

Seo, H., and Magnenat-Thalmann, N., 2003. An automatic modeling of human bodies from sizing parameters, ACM Symposium on Interactive 3D Graphics, 19-26.

Sloan,P.-P. J., Rose,C.F., and Cohen,M.F., 2001. Shape by example. 2001 Symposium on Interactive 3D Graphics 135-144.

Sumner, R.W. and Popovic, J., 2004. Deformation transfer to triangle meshes. Proceedings of ACM SIGGRAPH 2004, 23(3), 399-405.

Vasilescu, M., and Terzopoulos, D., 2002. Multilinear analysis of image ensembles: Tensorfaces. European Conference on Computer Vision(ECCV), 447-460.

Kahler, K., Haber, J., Yamauchi, H., and Seidel, H.-P., 2002. Head shop: generating animated head models with anatomical structure. ACM SIGGRAPH Symposium on Computer Animation, 55-64.

Lewis J. P., Cordner, M. and Fong, N. 2000. Pose space deformation : a unified approach to shape interpolation and skeleton- drive deformation. Proceedings of ACM SIGGRAPH 2000, 165-172.

Wang,X. C. and Phillips, C., 2002. Multi- weight enveloping: least squares approximation technique for skin animation. ACM SIGGRAPH Symposium on computer Animation, 129-138.

Allen, B., Curless,.B., and Popovic, Z., 2002. Articulated body deformation from range scan data. ACM Transactions on Graphics, 21(3),612-619.

Allen, B., Curless, B., and Popovic, Z., 2003. The space of human body shapes: reconstruction and parameterization from range scans. ACM Transactions on Graphics, 22 (3),587-594.

Anguelov, D., Koller, D., Pang, H., Srinivasan, P., and Thrun, S., 2004. Recovering articulated object models from 3d range data. Proceedings of the 20th conference on Uncertainty in artificial intelligence, 18-26.

Anguelov, D., Srinivasan, P., Pang. H., Koller, D., Thrun, S., and Davis, J., 2005. The correlated correspondence algorithm for unsupervised registration of nonridge surfaces. Advance in Neural Information Processing Systems 17,33-40.

Cheung, K. M., Baker, S., and Kanade, T., 2003. Shape-Form silhouette of articulated objects and its use for human body kinematics estimation and motion capture. Conference on computer Vision and Pattern Recognition (CVPR), 77-84.

Curless, B., and Levoy, M., 1996. A volumetric method of building complex models from range images. Proceedings of SIGGRAPH 1996, 303-312.

Davis, J., Marschner, S., Garr, M., and Levoy, M., 2002. Filing holes in complex surfaces using volumetric diffusion. Symposium on 3D Data Processing, Visualization, and Transmission.

Garland, M. and Heckbert, P.S., 1997. Surface simplification using quadric error metrics. Proceedings of SIGGRAPH 97, 209-216.

Hahnel, D., Thrun, S., and Burgard, W., 2003. An extension of the ICP algorithm for modeling nonrigid objects with mobile robots. Proceedings of the International Joint Conference on Artificial Intelligence (IJCAI).

Hilton, A., Starck, J., and Collins, G., 2002. From 3d shape capture to animated models. First International Symposion on 3D Date Processing, Visualization and Transmission (3DVPT2002).

Liepa, P., 2003. Filling holes in meshes. In Proc. of the Eurographics/ ACM SIGGRAPH.

Vlasic et al. (2005) Face Transfer with Multilinear Models, ACM Transactions on Graphics 24(3), 426-433 (2005).

\* cited by examiner

SHAPE COMPLETION, ANIMATION AND MARKER-LESS MOTION CAPTURE OF PEOPLE, ANIMALS OR CHARACTERS

CROSS-REFERENCE TO RELATED APPLICATIONS

This application claims the benefit from U.S. Provisional Application 60/833,549 filed Jul. 25, 2006, which is hereby incorporated by reference.

FEDERALLY-SPONSORED RESEARCH OR DEVELOPMENT

This invention was made with Government support under contracts HR0011-04-1-0016 awarded by the Defense Advanced Research Projects Agency and N000014-99-1-0464 awarded by the Office of Naval Research. The Government has certain rights in this invention.

FIELD OF THE INVENTION

The invention relates generally to computer graphics. In particular, the invention relates to shape completion and animation of people, animals and characters.

BACKGROUND

Graphics applications often require a complete surface model for rendering and animation. Obtaining a complete model of a particular person is often difficult or impossible. Even when the person can be constrained to remain motionless inside of a Cyberware full body scanner, incomplete surface data is obtained due to occlusions. When the task is to obtain a 3D sequence of the person in motion, the situation can be even more difficult. Existing marker-based motion capture systems usually provide only sparse measurements at a small number of points on the surface. The desire is to map such sparse data into a fully animated 3D surface model. The invention described herein advances the art by providing new exciting methods for shape completion and animation that overcomes at least some of the current shortcomings.

SUMMARY

This invention introduces the SCAPE method (Shape Completion and Animation for PEople)—a data-driven method for building a unified model of human shape. The method learns separate models of body deformation—one accounting for changes in pose and one accounting for differences in body shape between humans. The models provide a level of detail sufficient to produce dense full-body meshes, and capture details such as muscle deformations of the body in different poses. Importantly, the representation of deformation enables the pose and the body shape deformation spaces to be combined in a manner, which allows proper deformation scaling. For example, the model can correctly transfer the deformations of a large person onto a small person and vice versa.

The pose deformation component of the model is acquired from a set of dense 3D scans of a single person in multiple poses. A key aspect of the pose model is that it decouples deformation into a rigid and a non-rigid component. The rigid component of deformation is described in terms of a low degree-of-freedom rigid body skeleton. The non-rigid component captures the remaining deformation such as flexing of the muscles. In the model, the deformation for a body part is dependent only on the adjacent joints. Therefore, it is relatively low dimensional, allowing the shape deformation to be learned automatically, from limited training data.

The representation also models shape variation that occurs across different individuals. This model component can be acquired from a set of 3D scans of different people in different poses. The shape variation is represented by using principal component analysis (PCA), which induces a low-dimensional subspace of body shape deformations. Importantly, the model of shape variation does not get confounded by deformations due to pose, as those are accounted for separately.

The two parts of the model form a single unified framework for shape variability of people. The framework can be used to generate a complete surface mesh given only a succinct specification of the desired shape—the angles of the human skeleton and the eigen-coefficients describing the body shape. In examples described herein, the model is applied to two important graphics tasks.

The first is partial view completion. Most scanned surface models of humans have significant missing regions. Given a partial mesh of a person for whom we have no previous data, the method finds the shape that best fits the observed partial data in the space of human shapes. The model can then be used to predict a full 3D mesh. Importantly, because the model also accounts for non-rigid pose variability, muscle deformations associated with the particular pose are predicted well even for unobserved parts of the body.

The second task is producing a full 3D animation of a moving person from marker motion capture data. This problem is approached as a shape completion task. The input to the algorithm is a single scan of the person and a time series of extremely sparse data—the locations of a limited set of markers (usually, but not limited to, between 50 and 60) placed on the body. For each frame in the sequence, the full 3D shape of the person is predicted, in a pose consistent with the observed marker positions. Applying this technique to sequences of motion capture data produces full-body human 3D animations. The method has shown that it is capable of constructing high-quality animations, with realistic muscle deformation, for people of whom we have a single range scan.

Another application/task of the method is marker-less motion capture. 3D information about the movement of a subject can be obtained using a variety of 3D scanning methods, including but not limited to shape-from-silhouette or stereo processing of video from multiple synchronized streams. This information usually takes the form of a cloud of 3D points that lie (or approximately lie on the subject's body). The shape-completion technology described in this invention can be applied to this data to obtain 1) a trace of the skeleton movement of the subject and 2) a reconstruction of the subject's body shape and his/her deformations during the captured sequence. This can be done for a variety of different people in different poses in an automatic manner.

In all of these tasks, the method allows for variation of the individual body shape. For example, it allows for the synthesis of a person with a different body shape, not present in the original set of scans. The motion for this new character can also be synthesized, either based on a motion capture trajectory for a real person (of similar size), or keyframed by an animator. Thus, the approach of the invention makes it possible to create realistic shape completions and dense 3D animations for people whose exact body shape is not included in any of the available data sources or training sets.

The invention finds useful applications in marker-less motion capture, biomechanics, entertainment, animation and computer graphics, digital movies, clinical settings, interactive gaming and videos, biofeedback and rehabilitation, design and ergonomics, simulation of human and animal interaction, education, visual arts, robotics and the like.

BRIEF DESCRIPTION OF THE FIGURES

The file of this patent contains at least one drawing executed in color. Copies of this patent with color drawing(s) will be provided by the Patent and Trademark Office upon requite and payment of the necessary fee.

The objectives and advantages of the present invention will be understood by reading the following detailed description in conjunction with the drawing, in which.

DETAILED DESCRIPTION OF THE INVENTION

Introduction

Figure 1:
FIG. 1 shows an animation of a motion capture sequence taken for a subject, of whom we have a single body scan. The muscle deformations are synthesized automatically from the space of pose and body shape deformations.

The recent example-based approaches for learning deformable human models represent deformation by point displacements of the example surfaces, relative to a generic template shape. For modeling pose deformation, the template shape is usually assumed to be an articulated model. A popular animation approach called skinning (described in [Lewis et al. 2000]) assumes that the point displacements are generated by a weighted set of (usually linear) influences from neighboring joints. A more sophisticated method was presented by Allen et al. [2002], who register an articulated model (represented as a posable subdivision template) to scans of a human in different poses. The displacements for a new pose are predicted by interpolating from a set of example scans with similar joint angles.

A variety of related methods [Lewis et al. 2000; Sloan et al. 2001; Wang and Phillips 2002; Mohr and Gleicher 2003] differ only in the details of representing the point displacements, and in the particular interpolation method used. Models of pose deformation are learnt not only from 3D scans, but also by combining shape-from silhouette and marker motion capture sequences [Sand et al. 2003]. However, none of the above approaches learn a model of the shape changes between different individuals.

To model body shape variation across different people, Allen et al. [2003] morph a generic template shape into 250 scans of different humans in the same pose. The variability of human shape is captured by performing principal component analysis (PCA) over the displacements of the template points. The model is used for hole-filling of scans and fitting a set of sparse markers for people captured in the standard pose. Another approach, by Seo and Thalmann [2003], decomposes the body shape deformation into a rigid and a non-rigid component, of which the latter is also represented as a PCA over point displacements. Neither approach learns a model of pose deformation. However, they demonstrate preliminary animation results by using expert-designed skinning models. Animation is done by bringing the space of body shapes and the skinning model into correspondence (this can be done in a manual or semi-automatic way [Hilton et al. 2002]), and adding the point displacements accounting for pose deformation to the human shape. Such skinning models are part of standard animation packages, but since they are usually not learned from scan data, they usually don't model muscle deformation accurately.

An obvious approach for building a data-driven model of pose and body shape deformation would be to integrate two existing methods in a similar way. The main challenge, however, lies in finding a good way to combine two distinct deformation models based on point displacements. Point displacements cannot be multiplied in a meaningful way; adding them ignores an important notion of scale. For example, pose displacements learned on a large individual cannot be added to the shape of a small individual without undesirable artifacts. This problem been known in the fields of deformation transfer and expression cloning [Noh and Neumann 2001]. To address it, the present invention the deformation transfer method of Sumner and Popovic [2004] was used. It shows how to retarget the deformation of one mesh to another, assuming point-to-point correspondences between them are available. The transfer maintains proper scaling of deformation, by representing the deformation of each polygon using a $3 \times 3$ matrix. It suggests a way of mapping pose deformations onto a variety of human physiques. However, it does not address the task of representing and learning a deformable human model, which is tackled in the present invention.

Multi-linear models have been applied for modeling face variation in images [Vasilescu and Terzopoulos 2002]. A generative model of human faces has to address multiple factors of image creation such as illumination, expression and viewpoint. The face is modeled as a product of linear appearance models, corresponding to influences of the various factors. Ongoing work is applying multi-linear approaches to model 3D face deformation [Vlasic et al. 2004]. The present invention introduces a new method to the space of human body shapes, which exhibits articulated structure that makes human body modeling different from face modeling. In particular, in the present invention surface deformations are directly related to the underlying body skeleton. Such a model would not be sufficient to address face deformation, because a significant part of the deformation is purely muscle-based, and is not correlated with the skeleton.

The shape-completion application of the present invention is related to work in the area of hole-filling. Surfaces acquired with scanners are typically incomplete and contain holes. A common way to complete these holes is to fill them with a smooth surface patch that meets the boundary conditions of the hole [Curless and Levoy 1996; Davis et al. 2002; Liepa 2003]. These approaches work well when the holes are small compared to the geometric variation of the surface. By contrast, an application requiring the filling of huge holes (e.g., in some experiments more than half of the surface was not observed; in others it was only provided with sparse motion capture data) was addresses with the model-based method of the present invention. Other model-based solutions for hole filling were proposed in the past. Kahler et al [2002] and Szeliski and Lavallee [1996] use volumetric template-based methods for this problem. These approaches work well for largely convex objects, such as a human head, but are not easily applied to objects with branching parts, such as the human body. While the work of Allen et al. [2003] can be used for hole-filling of human bodies, it can only do so if the humans are captured in a particular pose.

Marker motion capture systems are widely available, and can be used for obtaining high-quality 3D models of a moving person. Existing animation methods (e.g. [Allen et al. 2002; Seo and Magnenat-Thalmann 2003]) do not utilize the marker data and assume the system directly outputs the appropriate skeleton angles. They also do not handle body shape variation well, as previously discussed. Both of these limitations are lifted in the present invention.

Acquiring and Processing Data Meshes

Figure 2:
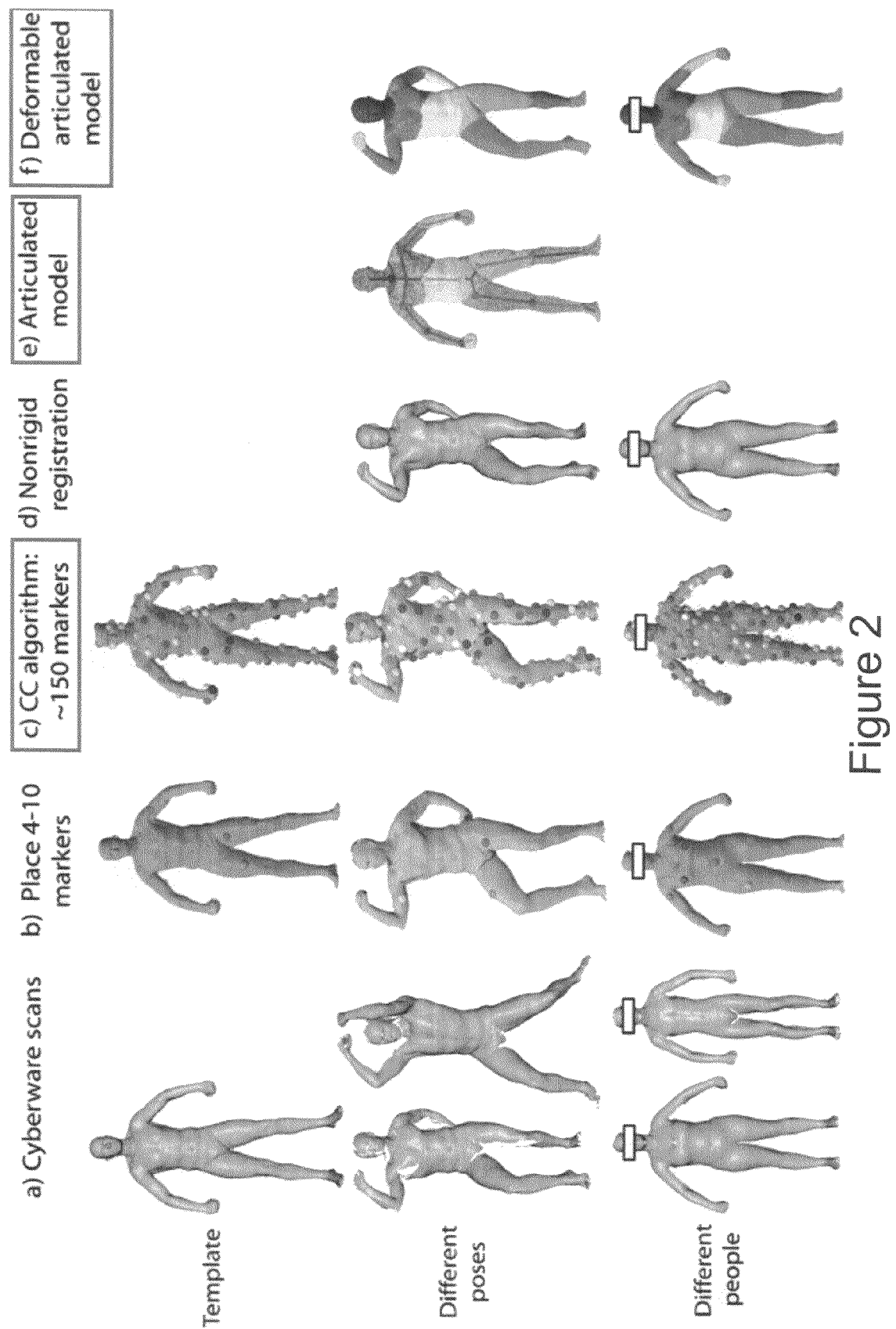
FIG. 2 shows the mesh-processing pipeline used to generate our training set. (a) Two data sets were acquired spanning the shape variability due to different human poses and different physiques. (b) A few markers were selected by hand mapping the template mesh and each of the range scans. (c) The Correlated Correspondence algorithm was applied, which computes numerous additional markers. (d) The markers were used as input to a non-rigid registration algorithm, producing fully registered meshes. (e) A skeleton reconstruction algorithm was applied to recover an articulated skeleton from the registered meshes. (f) The space of deformations were learnt due to pose and physique.

The SCAPE model acquisition is data driven, and all the information about the shape is derived from a set of range scans. This section describes the basic pipeline for data acquisition and pre-processing of the data meshes using a computer or computer system. This pipeline, displayed in FIG. 2, which includes largely a combination of previously published methods. The specific design of the pipeline is inessential for the main contribution of this invention; it is first described to introduce the type of data used for learning the model.
Range Scanning In one embodiment, surface data was acquired using a Cyberware WBX whole-body scanner at the Stanford Biomotion Lab. The scanner captures range scans from four directions simultaneously and the models contain about 200K points. This scanner was used to construct full-body instance meshes by merging the four scan views [Curless and Levoy 1996] and subsampling the instances to about 50,000 triangles [Garland and Heckbert 1997].

Using the process above, two data sets were obtained: a pose data set, which contains scans of 70 poses of a particular person in a wide variety of poses, and a body shape data set, which contains scans of 37 different people in a similar (but not identical) pose. Eight publicly available models were added from the CAESAR data set [Allen et al. 2003] to the data set of individuals.

One of the meshes was selected in the pose data set to be the template mesh; all other meshes were called instance meshes. The function of the template mesh is to serve as a point of reference for all other scans. The template mesh is hole-filled using an algorithm by Davis et al. [2002]. In acquiring the template mesh, it was ensured that only minor holes remained mostly between the legs and the armpits. The template mesh and some sample instance meshes are displayed in FIG. 2(a). Note that the head region is smoothed in some of the figures, to hide the identity of the scan subjects; the complete scans were used in the learning algorithm.
Correspondence The next step in the data acquisition pipeline brings the template mesh into correspondence with each of the other mesh instances. Current non-rigid registration algorithms require that a set of corresponding markers between each instance mesh and the template is available (the work of Allen et al. [2003] uses about 70 markers for registration). In the present method of this invention, the markers were obtained using an algorithm called Correlated Correspondence (CC) [Anguelov et al. 2005]. The CC algorithm computes the consistent embedding of each instance mesh into the template mesh, which minimizes deformation, and matches similar-looking surface regions. To break the scan symmetries, the CC algorithm was initialized by placing 4-10 markers by hand on each pair of scans. The result of the algorithm is a set of 140-200 (approximate) correspondence markers between the two surfaces, as illustrated in FIG. 2(c).
Non-rigid Registration Given a set of markers between two meshes, the task of non-rigid registration is well understood and a variety of algorithms exist [Allen et al. 2002; H"ahnel et al. 2003; Sumner and Popovi'c 2004]. The task is to bring the meshes into close alignment, while simultaneously aligning the markers. A standard algorithm [Hahnel et al. 2003] was applied to register the template mesh with all of the meshes in our data set. As a result, a set of meshes with the same topology were obtained, whose shape approximates well the surface in the original Cyberware scans. Several of the resulting meshes are displayed in FIG. 2(d).
Recovering the Articulated Skeleton The model in this invention uses a low degree-of-freedom skeleton to model the articulated motion. A skeleton was constructed for our template mesh automatically, using only the meshes in the data set. The algorithm of [Anguelov et al. 2004] was applied, which uses a set of registered scans of a single subject in a variety of configurations. The algorithm exploits the fact that vertices on the same skeleton joint are spatially contiguous, and exhibit similar motion across the different scans. It automatically recovers a decomposition of the object into approximately rigid parts, the location of the parts in the different object instances, and the articulated object skeleton linking the parts. Based on the pose data set, the algorithm automatically constructed a skeleton with 18 parts. The algorithm broke both the crotch area and the chest area into two symmetric parts, resulting in a skeleton, which was not tree-structured. To facilitate pose editing, the two parts were combined in each of these regions into one. The result was a tree-structured articulated skeleton with 16 parts.
Data Format and Assumptions The resulting data set includes a model mesh X and a set of instance meshes $Y=\{Y^1, \ldots Y^N\}$. The model mesh $X=\{V_X, P_X\}$ has a set of vertices $V_X=\{X_1, \ldots X_M\}$ and a set of triangles $P_X=\{p_1, \ldots p_P\}$. The instance meshes are of two types: scans of the same person in various poses, and scans of multiple people in approximately the same pose. As a result of the pre-processing, one can assume that each instance mesh has the same set of points and triangles as the model mesh, albeit in different configurations. Thus, let $Y_1^i=\{y_1^i, \ldots, y_M^i\}$ be the set of points in instance mesh $Y^i$. As we also mapped each of the instance meshes onto our articulated model in the pre-processing phase, we also have, for each mesh $Y^i$, a set of absolute rotations $R^i$ for the rigid parts of the model, where $R_l^i$ is the rotation of joint l in instance i.

The data acquisition and pre-processing pipeline provides us with exactly this type of data; however, any other technique for generating similar data will also be applicable to our learning and shape completion approach.

Pose Deformation

This and the following sections describe the SCAPE model and method. In the SCAPE model and method, deformations due to changes in pose and body shape are modeled separately. This section focuses on learning the pose deformation model.

Deformation Process

One first would want to model the deformations, which align the template with each mesh $Y^i$ in the data set containing different poses of a human. The deformations are modeled for each triangle $p_k$ of the template. One could use a two-step, translation invariant representation of triangle deformations, accounting for a non-rigid and a rigid component of the deformation. Let triangle $p_k$ contain the points $x_{k,1}, x_{k,2}, x_{k,3}$. The deformations are applied in terms of the triangle's local coordinate system, obtained by translating point $x_{k,1}$ to the global origin. Thus, the deformations will be applied to the triangle edges $\hat{v}_{k,j} = x_{k,j} -, x_{k,1}, j=2,3$.

First, a 3×3 linear transformation matrix $Q_k^i$ is applied to the triangle. This matrix, which corresponds to a non-rigid pose-induced deformation, is specific to each triangle $p_k$ and each pose $Y_i$. The deformed polygon is then rotated by $R_l^i$ the rotation of its rigid part in the articulated skeleton. The same rotation is applied to all triangles that belong to that part. Letting l[k] be the body part associated with triangle $p_k$, gives:

$$v_{k,j}^i = R_{l[k]}^i Q_k^i \hat{v}_{k,j}, j=2, 3 \quad (1)$$

Figure 3:
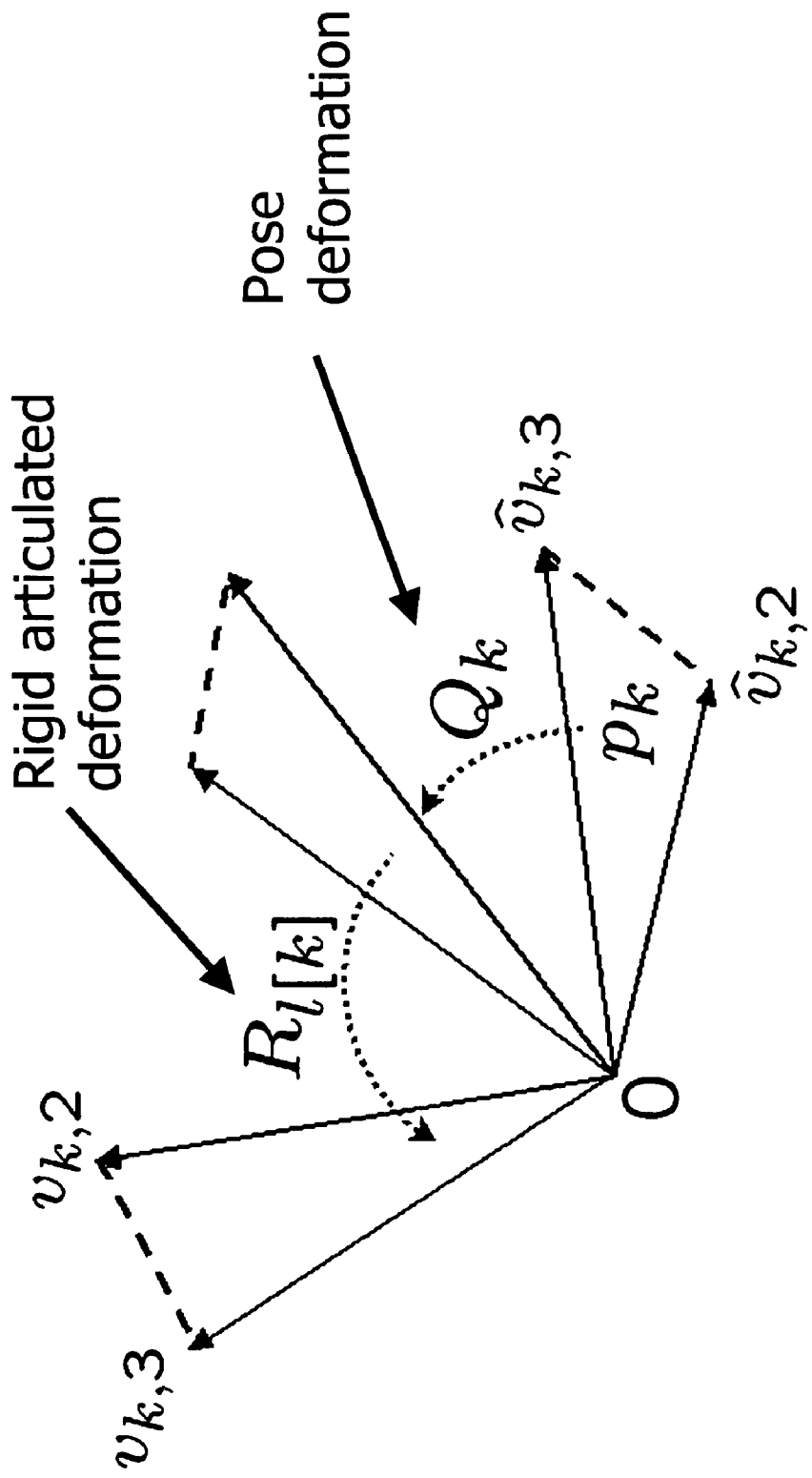
FIG. 3 shows an illustration of our model for triangle deformation.

The deformation process is sketched in FIG. 3. A key feature of this model is that it combines an element modeling the deformation of the rigid skeleton, with an element that allows for arbitrary local deformations. The latter is essential for modeling muscle deformations. Given a set of transformation matrices Q and R associated with a pose instance, the method's predictions can be used to synthesize a mesh for that pose. For each individual triangle, the method makes a prediction for the edges of $p_k$ as $R_k Q_k \hat{v}_{k,j}$. However, the predictions for the edges in different triangles are rarely consistent. Thus, to construct a single coherent mesh, the location of the points $y_1, \ldots y_M$ are solved that minimize the overall least squares error:

$$\underset{y_1, \ldots y_M}{\operatorname{argmin}} \sum_k \sum_{j=2,3} \| R_{l[k]}^i R_k^i \hat{v}_{j,k} - (y_{j,k} - y_{1,k}) \|^2 \quad (2)$$

Note that, as translation is not directly modeled, the problem has a translational degree of freedom. By anchoring one of the points y (in each connected component of the mesh) to a particular location, the problem can be made well-conditioned, and reconstruct the mesh in the appropriate location. (See [Sumner and Popovic 2004] for a related discussion on mesh reconstruction from a set of deformation matrices.)

Learning the Pose Deformation Model

It was shown herein how to model pose-induced deformations using a set of matrices $Q_k^i$ for the template triangles $p_k$. We want to predict these deformations from the articulated human pose, which is represented as a set of relative joint rotations. If $R_{l_1}$ and $R_{l_2}$ are the absolute rotation matrices of the two rigid parts adjacent to some joint, the relative joint rotation is simply $R_{l_1}^T R_{l_2}$.

Joint rotations are conveniently represented with their twist coordinates. Let M denote any 3×3 rotation matrix, and let $m_{ij}$ be its entry in i-th row and j-th column. The twist t for the joint angle is a 3D vector, and can be computed from the following formula [Ma et al. 2004]:

$$t = \frac{\|\theta\|}{2\sin\|\theta\|} \begin{bmatrix} m_{32} - m_{23} \\ m_{13} - m_{31} \\ m_{21} - m_{12} \end{bmatrix} \text{ with }$$

$$\theta = \cos^{-1}\left(\frac{tr(M) - 1}{2}\right)$$

The direction of the twist vector represents the axis of rotation, and the magnitude of the twist represents the rotation amount. A regression function is learnt for each triangle $p_k$ which predicts the transformation matrices $Q_k^i$ as a function of the twists of its two nearest joints $\Delta r_{l[k]}^i = (\Delta r_{l[k],1}^i, \Delta r_{l[k],2}^i)$. By assuming that a matrix $Q_k^i$ can be predicted in terms of these two joints only, the dimensionality of the learning problem is greatly reduced.

Each joint rotation is specified using three parameters, so altogether $\Delta r_{l[k]}^i$ has six parameters. Adding a term for the constant bias, we associate a 7×1 regression vector $a_{k,lm}$ with each of the 9 values of the matrix Q, and write:

$$q_{k,lm}^i = a_{k,lm}^T \cdot \begin{bmatrix} \Delta r_{l[k]}^i \\ 1 \end{bmatrix} \quad l, m = 1, 2, 3 \quad (3)$$

Thus, for each triangle $p_k$, we have to fit 9×7 entries $a_k = (a_{k,lm}, l, m=1;2;3)$. With these parameters, one will have $$Q_k^i = \mathcal{P}_{a_k}(\Delta r_{l[k]}^i)$$

The goal now is to learn these parameters $a_{k,lm}$. If given the transformation $Q_k^i$ for each instance $Y^i$ and the rigid part rotations $R^i$, solving for the regression values (using a quadratic cost function) is straightforward. It can be carried out for each triangle k and matrix value $q_{k,lm}$ separately:

$$\underset{a_{k,lm}}{\operatorname{argmin}} \sum_i ([\Delta r^i 1] a_{k,lm} - q_{k,lm}^i)^2 \quad (4)$$

A more complicated non-linear regression model, which can capture non-linear deformation effects can be used as well. In general, any standard regression model can be used. One embodiment of this invention uses Support Vector Machine regression [Schölkopf and Smola 1998]. Just like in the linear case, we learn predictors $f([\Delta r^i 1])$ which map joint angles to the values of the matrices Q.

In practice, one could save on model size and computation by identifying joints, which have only one or two degrees of freedom. Allowing those joints to have three degrees of freedom can also cause overfitting in some cases. PCA were performed on the observed angles of the joints $\Delta r^i$, removing axes of rotation whose eigenvalues are smaller than 0.1. The associated entries in the vector $a_{k,lm}$ are then not estimated. The value 0.1 was obtained by observing a plot of the sorted eigenvalues. It was found that the pruned model minimally increased cross-validation error, while decreasing the number of parameters by roughly one third.

As discussed, the rigid part rotations are computed as part of the preprocessing step. Unfortunately, the transformations $Q_k^i$ for the individual triangles are not known. These matrices were estimated by fitting them to the transformations observed in the data. However, the problem is generally underconstrained. The Sumner et al. [2004] and Allen et al. [2003] was followed, and introduce a smoothness constraint which prefers similar deformations in adjacent polygons that belong to the same rigid part. Specifically, the correct set of linear transformations was solved with the following equation for each mesh $Y^i$:

$$\underset{Q_1^i,\ldots Q_p^i}{\mathrm{argmin}} \sum_k \sum_{j=2,3} \|R_k^i Q_k^i \hat{v}_{k,j} - v_{k,j}^i\|^2 + \qquad (5)$$
$$w_s \sum_{k_1,k_2 adj} I(l_{k_1} = l_{k_2}) \cdot \|Q_{k_1}^i - Q_{k_2}^i\|^2$$

where $w_s = 0.001\rho$ and $\rho$ is the resolution of the model mesh X. Above, $I(\cdot)$ is the indicator function. The equation can be solved separately for each rigid part and for each row of the Q matrices.

Given the estimated Q matrices, we can solve for the (at most) 9×7 regression parameters $a_k$ for each triangle k, as described in Eq. (4).

Application to Data Set

Figure 4:
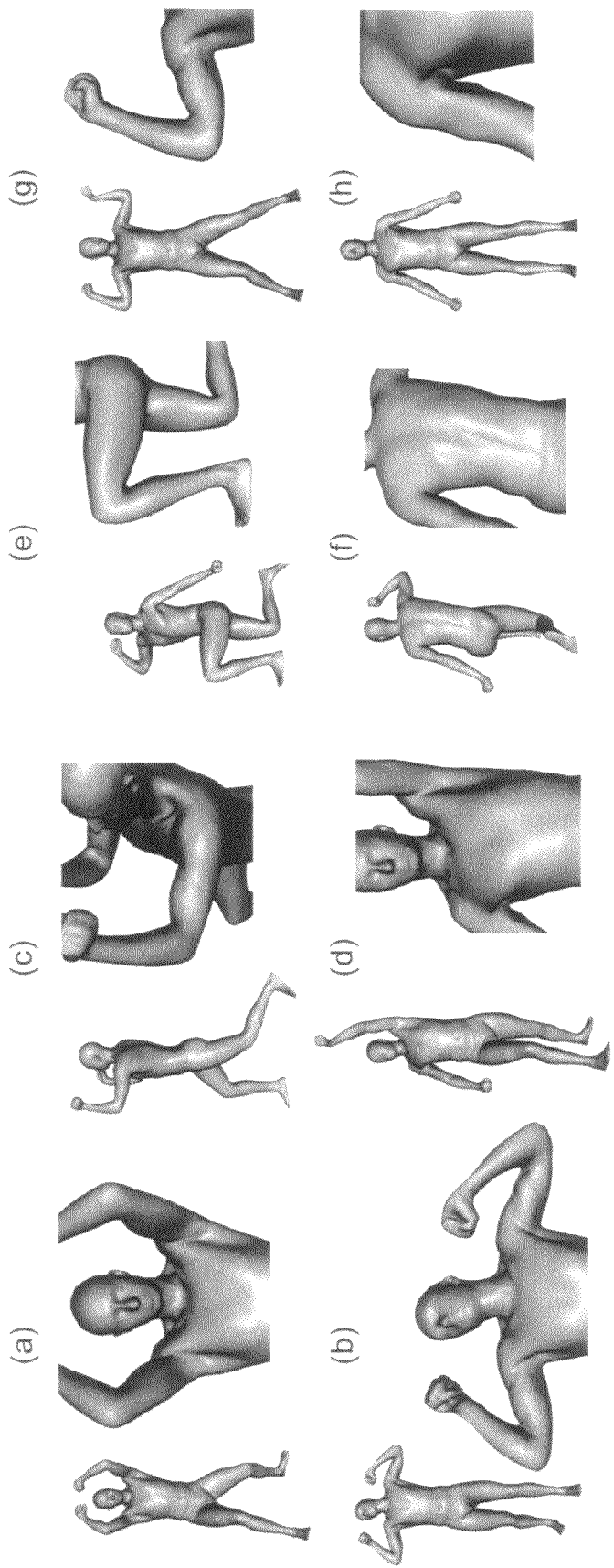
FIG. 4 shows examples of muscle deformations that can be captured in the SCAPE pose model.

The method described in the previous section was applied to learn a SCAPE pose deformation model using the 70 training instances in our pose data set. FIG. 4 shows examples of meshes that can be represented by our learned model. Note that these examples do not correspond to meshes in the training data set; they are new poses synthesized completely from a vector of joint rotations R, using Eq. (3) to define the Q matrices, and Eq. (2) to generate the mesh.

The model captures well the shoulder deformations, the bulging of the biceps and the twisting of the spine. It deals well with the elbow and knee joints, although example (g) illustrates a small amount of elbow smoothing that occurs in some poses. The model exhibits an artifact in the armpit, which is caused by hole-filling in the template mesh.

Generating each mesh given the matrices takes approximately 1 second, only 1.5 orders of magnitude away from real time, opening the possibility of using this type of deformation model for real-time animation of synthesized or cached motion sequences.

Body-Shape Deformation

The SCAPE model also encodes variability due to body shape across different individuals. One can now assume that the scans of the training set $Y^i$ correspond to different individuals.

Deformation Process

The body-shape variation was modeled independently of the pose variation, by introducing a new set of linear transformation matrices $S_k^i$, one for each instance i and each triangle k. It was assumed that the triangle $p_k$ observed in the instance mesh i is obtained by first applying the pose deformation $Q_k^i$, then the body shape deformation $S_k^i$, and finally the rotation associated with the corresponding joint $R_{l[k]}^i$. The application of consecutive transformation matrices maintains proper scaling of deformation. The following extension was obtained to Eq. (1):

$$v_{k,j}^i = R_{l[k]}^i S_k^i Q_k^i \hat{v}_{k,j}$$

The body deformation associated with each subject i can thus be modeled as a set of matrices $$S^i = \{S_k^i : k=1,\ldots p\}.$$

Learning the Shape Deformation Model

To map out the space of body shape deformations, the different matrices $S^i$ were viewed as arising from a lower dimensional subspace. For each example mesh, a vector of size 9×N was created containing the parameters of matrices $S^i$. It was assumed that these vectors are generated from a simple linear subspace, which can be estimated by using PCA:

$$S^i = \zeta_{U,\mu}(\beta^i) = \overline{U\beta^i + \mu} \qquad (7)$$

where $U\beta^i+\mu$ is a (vector form) reconstruction of the 9×N matrix coefficients from the PCA, and $\overline{U\beta^i+\mu}$ is the representation of this vector as a set of matrices. PCA is appropriate for modeling the matrix entries, because body shape variation is consistent and not too strong. It was found that even shapes which are three standard deviations from the mean still look very much like humans (see FIG. 5). If given the affine matrices $S_k^i$ for each l,k one can easily solve for the PCA parameters U, $\mu$, and the mesh-specific coefficients $\beta^i$. However, as in the case of pose deformation, the individual shape deformation matrices $S_k^i$ are not given, and need to be estimated. the same idea as above can be used, and solve directly for $S_k^i$, with the same smoothing term as in Eq. (5):

$$\underset{S^i}{\mathrm{argmin}} \sum_k \sum_{j=2,3} \|R_k^i S_k^i Q_k^i \hat{v}_{k,j} - v_{k,j}^i\|^2 + w_s \sum_{k_1,k_2 adj} \|S_{k_1}^i - S_{k_2}^i\|^2 \qquad (8)$$

Importantly, recall that the data preprocessing phase provides us with an estimate $R^i$ for the joint rotations in each instance mesh, and therefore the joint angles $\Delta r^i$. From these one can compute the predicted pose deformations $$Q_k^i = \xi(\Delta r_{l[k]}^i)$$

using our learned pose deformation model. Thus, the only unknowns in Eq. (8) are the shape deformation matrices $S_k^i$. The equation is quadratic in these unknowns, and therefore can be solved using a straightforward least-squares optimization.

Application to Data Set

Figure 5:
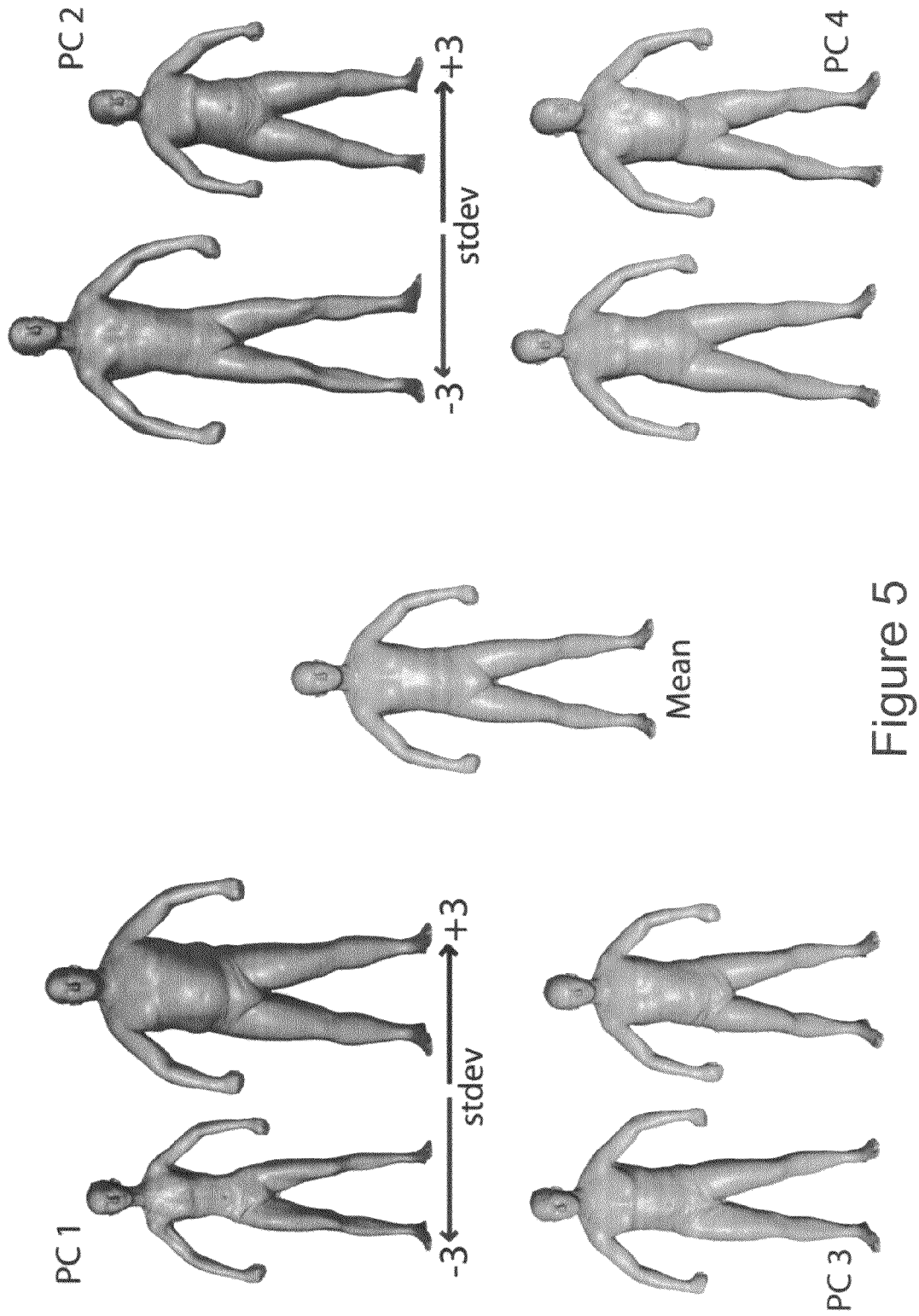
FIG. 5 shows the first four principal components in the space of body shape deformation.

The method described in previous section is applied to learn a SCAPE body shape deformation model using the 45 instances in the body shape data set, and taking as a starting point the pose deformation model learned as described in sub-section "Application to Data Set" under section "Pose Deformation". FIG. 5 shows the mean shape and the first four principal components in our PCA decomposition of the shape space. These components represent very reasonable variations in weight and height, gender, abdominal fat and chest muscles, and bulkiness of the chest versus the hips.

The PCA space spans a wide variety of human body shapes. Put together with the pose model, one can now synthesize realistic scans of various people in a broad range of poses. Assume that one is given a set of rigid part rotations R and person body shape parameters $\beta$. The joint rotations R determine the joint angles $\Delta R$. For given triangle $p_k$, the pose model now defines a deformation matrix $Q_k = \xi a_k(\Delta r_{l[k]})$. The body shape model defines a deformation matrix $S_k = \zeta_{U,u}(\beta^i)$.

As in Eq. (2), one then solves for the vertices Y that minimize the objective:

$$E_H[Y] = \sum_k \sum_{j=2,3} \|R_k \zeta_{U,\mu}(\beta) \xi a_k(\Delta r_{l[k]}) \hat{v}_{j,k} - (y_{j,k} - y_{1,k})\|^2 \quad (9)$$

The objective can be solved separately along each dimension of the points y.

Figure 6:
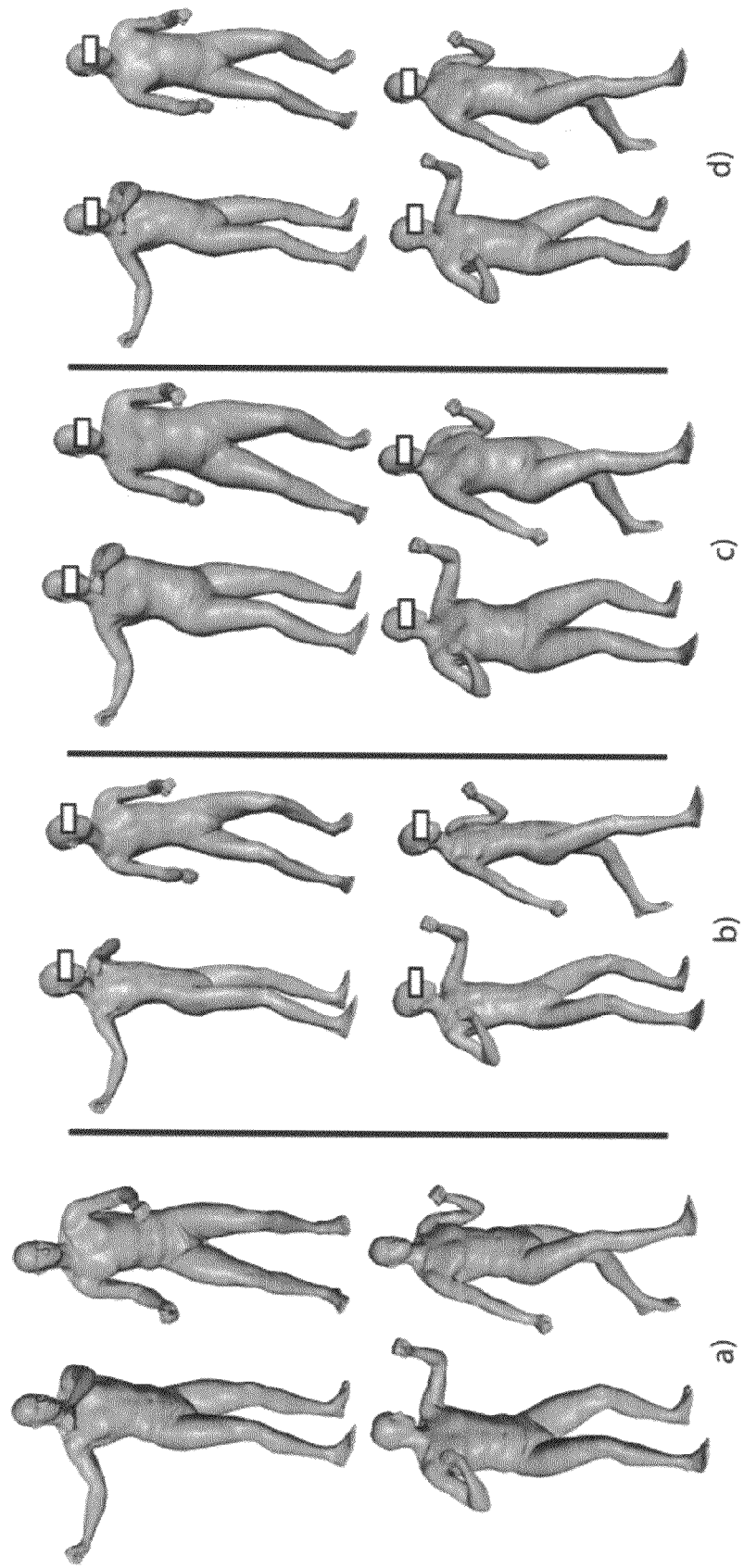
FIG. 6 shows deformation transfer by the SCAPE model. The figure shows three subjects, each in four different poses. Each subject was seen in a single reference pose only.

Using this approach, a mesh can be generated for any body shape in our PCA space in any pose. FIG. 6 shows some examples of different synthesized scans, illustrating variation in both body shape and pose. FIG. 6 shows that realistic muscle deformation is achieved for very different subjects, and for a broad range of poses.

Shape Completion

So far, the description has focused on the problem of constructing the two components of the SCAPE model from the training data: the regression parameters $\{a_k: k=1, \ldots, P\}$ of the pose model, and the PCA parameters $U; \mu$ of the body shape model. It is now shown in some exemplary embodiments how to use the SCAPE model to address the task of shape completion. The following examples address the problem of being given sparse information about an instance mesh, and the desire to construct a full mesh consistent with this information. The SCAPE model defines a prior on the deformations associated with human shape, and therefore provides with guidance on how to complete the mesh in a realistic way.

Assume having a set of markers $Z = z_1, \ldots, z_L$ which specify known positions in 3D for some points $x_1, \ldots x_L$ on the model mesh. The objective is to find the set of points Y that best fits these known positions, and is also consistent with the SCAPE model. In this setting, the joint rotations R and the body shape parameters $\beta$ are also not known. Therefore we need to solve simultaneously for Y, R, and $\beta$ minimizing the objective:

$$E_H[Y] + w_z \sum_{l=1}^{L} \|y_l - z_l\|^2 \quad (10)$$

where $E_H[Y]$ was defined in Eq. (9) and $w_z$ is a weighting term that trades off the fit to the markers and the consistency with the model.

A solution to this optimization problem is a completed mesh $Y[Z]$ that both fits the observed marker locations and is consistent with the predictions of the learned SCAPE model. It also produces a set of joint rotations R and shape parameters $\beta$. Note that these parameters can also be used to produce a predicted mesh $\hat{Y}[Z]$, as in one of the previous sections. This predicted mesh is (by definition) constrained to be within the PCA subspace of shapes; thus it generally does not encode some of the details unique to the new (partial) instance mesh to be completed. As is shown, the predicted mesh $\hat{Y}[Z]$ can also be useful for smoothing certain undesirable artifacts.

Eq. (10) is a general non-linear optimization problem to which a number of existing optimization techniques can be applied. The embodiment of a specific implementation of the optimization is intended to address the fact that Eq. (10) is non-linear and non-convex, hence is subject to local minima. Empirically, we find that care has to be taken to avoid local minima. Hence, an optimization routine was devised that slows the adaptation of certain parameters in the optimization, thereby avoiding the danger of converging to sub-optimal shape completions. In particular, optimizing over all of the variables in this equation using standard non-linear optimization methods is not a good idea. The present method uses an iterative process, where it optimizes each of the three sets of parameters (R, $\beta$, and Y) separately, keeping the others fixed.

The resulting optimization problem still contains a non-linear optimization step, due to the correlation between the absolute part rotations R and the joint rotations $\Delta R$, both of which appear in the objective of Eq. (10). An approximate method is used to deal with this problem. The approach here is based on the observation that the actual joint rotations R influence the point locations much more than their (fairly subtle) effect on the pose deformation matrices via $\Delta R$. Thus, we can solve for R while ignoring the effect on $\Delta R$, and then update $\Delta R$ and the associated matrices $\xi_a(\Delta r)$. This approximation gives excellent results, as long as the value of $\Delta R$ does not change much during each optimization step. To prevent this from happening, one could add an additional term to the objective in Eq. (10). The term penalizes steps where adjacent parts (parts that share a joint) move too differently from each other.

Specifically, when optimizing R, we approximate rotation using the standard approximation $R^{new} \approx (I + \hat{t}) R^{old}$, where $t = (t_1; t_2; t_3)$ is a twist vector, and $$\hat{t} = \begin{pmatrix} 0 & -t_3 & t_2 \\ t_3 & 0 & -t_1 \\ -t_2 & t_1 & 0 \end{pmatrix} \quad (11)$$

Let $t_l$ denote the twist vector for a part l. The term preventing large joint rotations then is simply $$\sum_{l_1 l_2 adj} \|t_{l_1} - t_{l_2}\|^2.$$

We are now ready to state the overall optimization technique applied. This technique iteratively repeats three steps:

Update R, resulting in the following equation:

$$\operatorname*{argmin}_{t} \sum_k \sum_{j=2,3} \|(I + \hat{t}_{l_k}) R^{old} S Q \hat{v}_{j,k} - (v_{j,k} v_{1,k})\|^2 + w_T \sum_{l_1 l_2 adj} \|t_{l_1} - t_{l_2}\|^2.$$

Here $S = \zeta_{U,\mu}(\beta)$ according to the current value of $\beta$, $Q = \xi_{a_k}(\Delta r_{l[k]})$ where $\Delta R$ is computed from $R^{old}$, and $w_T$ is an appropriate trade-off parameter. After each update to R, update $\Delta R$ and Q accordingly.

Update Y to optimize Eq. (10), with R and $\beta$ fixed. In this case, the S and Q matrices are determined, and the result is a simple quadratic objective that can be solved efficiently using standard methods.

Update $\beta$ to optimize Eq. (10). In this case, R and the Q matrices are fixed, as are the point positions Y, so that the objective reduces to a simple quadratic function of $\beta$:

$$\sum_k \sum_{j=2,3} \|R_k (\overline{U\beta + \mu})_k Q \hat{v}_{j,k} - (y_{j,k} - y_{1,k})\|^2$$

This optimization process converges to a local optimum of the objective Eq. (10).

Partial View Completion

An application of the shape completion method is to the task of partial view completion. Here, a partial scan of a human body is given, with the task is to produce a full 3D mesh which is consistent with the observed partial scan, and provides a realistic completion for the unseen parts.

The shape completion algorithm described herein applies directly to this task. The partial scan is taken, and manually annotate with a small number of markers (for example, but not limited to, 4-10 markers, 7 on average). We then apply the CC algorithm [Anguelov et al. 2004] to register the partial scan to the template mesh. The result is a set of 100-150 markers, mapping points on the scan to corresponding points on the template mesh. This number of markers is sufficient to obtain a reasonable initial hypothesis for the rotations R of the rigid skeleton. We then iterate between two phases. First, we find point-to-point correspondences between the partial view and our current estimate of the surface Y[Z]. Then we use these correspondences as markers and solve Eq. (10) to obtain a new estimate Y[Z] of the surface. Upon convergence, we obtain a completion mesh Y[Z], which fits the partial view surface as well as the SCAPE model.

Figure 7:
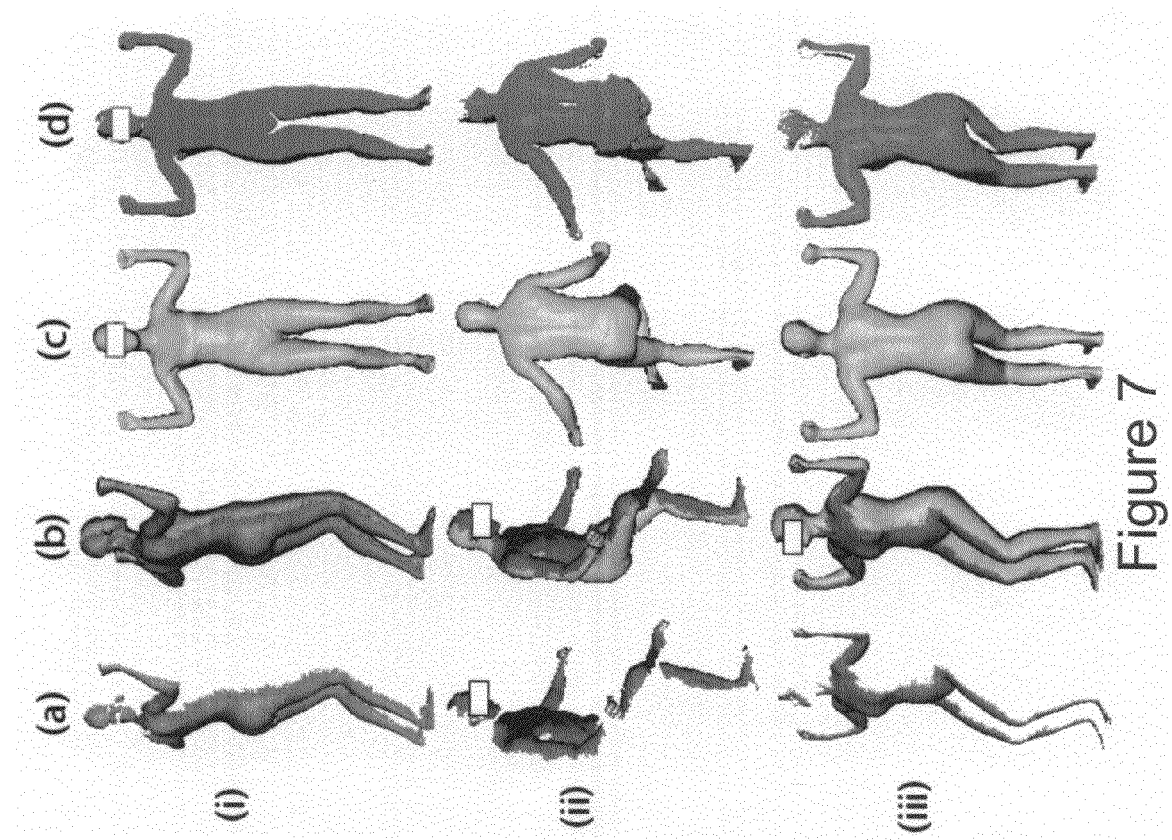
FIG. 7 shows examples of view completion, where each row represents a different partial view scan. Subject (i) is in the data set but not in the this pose; neither subjects (ii) and (iii) nor their poses are represented in the data set. (a) The original partial view. (b) The completed mesh from the same perspective as (a), with the completed portion in yellow. (c) The completed mesh from a view showing the completed portion. (d) A true scan of the same subject from the view in (c).

FIG. 7 shows the application of this algorithm to three partial views. Row (i) shows partial view completion results for a subject who is present in our data set, but in a pose that is not in the training (learnt) data set. The prediction for the shoulder blade deformation is very realistic; a similar deformation is not present in the training pose for this subject. Rows (ii) and (iii) show completion for subjects who are not in the training (learnt) data set, in poses that are not in the training (learnt) data set. The task in row (ii) is particularly challenging, both because the pose is very different from any pose in our data set, and because the subject was wearing pants, which we cut out, (see FIG. 7(ii)-(d)), leading to the large hole in the original scan. Nevertheless, the completed mesh contains realistic deformations in both the back and the legs.

Motion Capture Animation

The shape completion framework can also be applied to produce animations from marker motion capture sequences. In this case, we have a sequence of frames, each specifying the 3D positions for some set of markers. One can view the set of markers observed in each frame as our input Z to the algorithm described in the section "Shape Completion", and use the algorithm to produce a mesh. The sequence of meshes produced for the different frames can be strung together to produce a full 3D animation of the motion capture sequence.

Note that, in many motion capture systems, the markers protrude from the body, so that a reconstructed mesh that achieves the exact marker positions observed may contain unrealistic deformations. Therefore, rather than using the completed mesh Y[Z] (as in our partial view completion task), we use the predicted mesh $\tilde{Y}[Z]$. As this mesh is constrained to lie within the space of body shapes encoded by the PCA model, it tends to avoid these unrealistic deformations.

We applied this data to two motion capture sequences, both for the same subject S. Notably, our training data set only contains a single scan for subject S, in the standard position shown in the third row of FIG. 2(a). Each of the sequences used 56 markers per frame, distributed over the entire body. We took a 3D scan of subject S with the markers, and used it to establish the correspondence between the observed markers and points on the subject's surface. We then applied the algorithm of Sec. 6 to each sequence frame. In each frame, we used the previous frame's estimated pose R as a starting point for the optimization. The animation was generated from the sequence of predicted scans $\tilde{Y}[Z_j]$. Using an (un-optimized) implementation, it took approximately 3 minutes to generate each frame.

Figure 8:
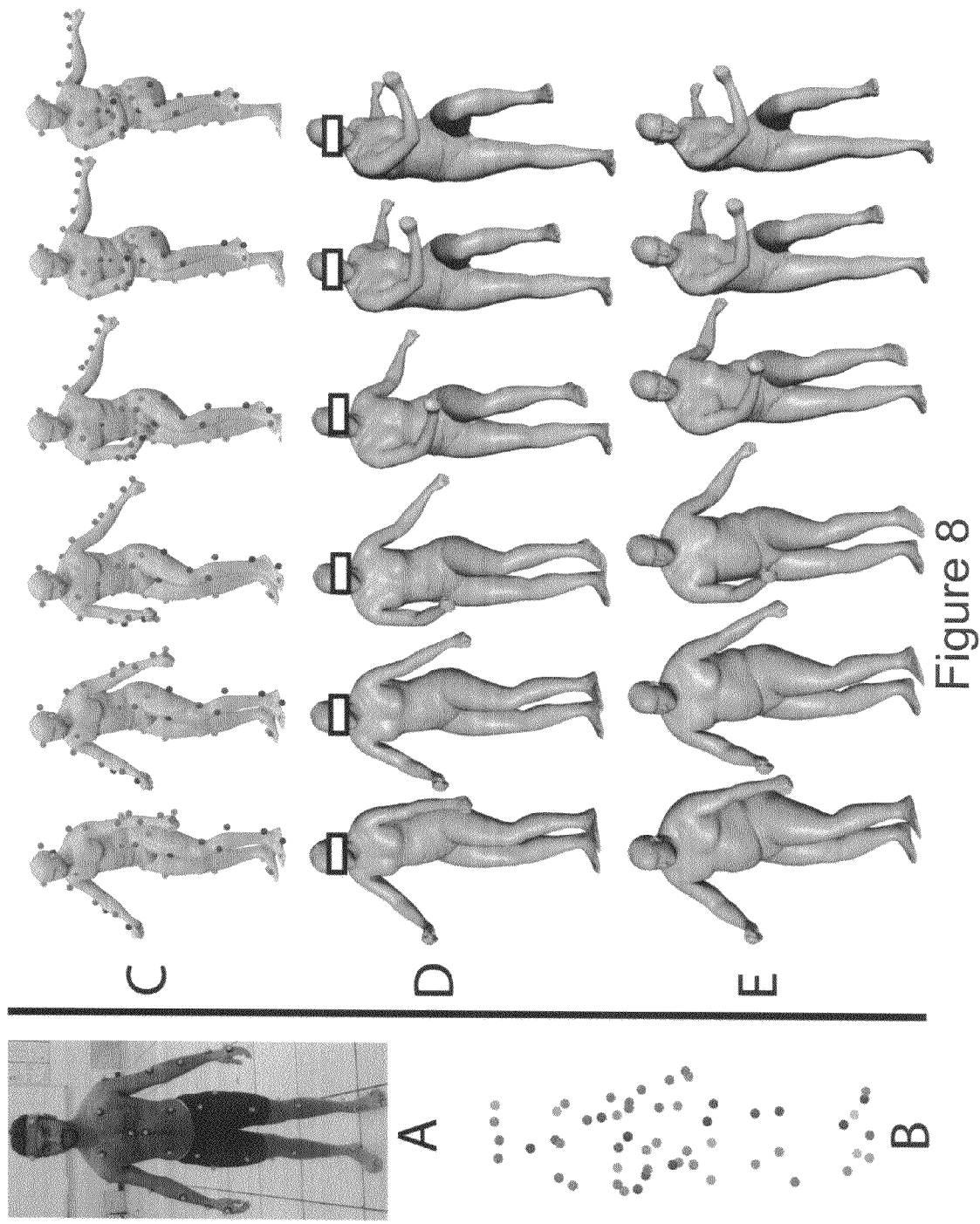
FIG. 8 shows motion capture animation. (a) Subject wearing motion capture markers (b) Motion capture markers in a single frame (c) An animation of a subject based on a motion capture sequence, with the markers from which the animation was derived superimposed on the meshes. (d) An example of motion transfer to a different subject in our data set. (e) Animation based on motion capture, but where the body shape parameters in PCA space were changed as we move through the sequence.

FIG. 8 demonstrates some of the results. Realistic muscle deformation were obtained for subject S (FIG. 8(c)). Additionally it is shown that motion transfer can be performed onto a different subject in our data set (FIG. 8(d)) and that the subject can be changed during the motion sequence (FIG. 8(e)).

Variations

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

This description presents the SCAPE model, which captures human shape deformation due to both pose variation and to body shape variation over different subjects. Results demonstrate that the presented model and methods can generate realistic meshes for a wide range of subjects and poses. It was further shown that the SCAPE model and methods can be used for shape completion, and cast two important graphics tasks—partial view completion and motion capture animation—as applications of our shape completion algorithm.

The SCAPE model decouples the pose deformation model and the body shape deformation model. This design choice greatly simplifies the mathematical formulation, improves the identifiability of the model from data, and allows for more efficient learning algorithms.

The method can be varied by learning both spaces from a random mix of scans from different people in different poses. The model could be learnt from a non-uniform data set, by iterating between estimating either the pose or the body shape model while keeping the other one fixed. It is noted, though, that such a process would result in a local minimum in the joint space of deformations. Hence it cannot be predicted how good this local minimum would be since it depends specifically on the training data that was given, and on the search method used.

Although, the pose deformation in model is determined by linear regression from adjacent joint angles, other models (e.g. linear and/or non-linear regression methods such as, but not limited to, radial basis functions and support vector machines) could be used.

The SCAPE model deals with representing muscle deformations resulting from articulated body motion. In addition, deformations resulting from other factors could also be encoded. One such factor is deformation resulting from pure muscle activity. For example, to distinguish between a flexed bicep muscle and a lax one in cases where the joint angle is the same. Furthermore, it would be able to deal with faces, where most of the motion is purely muscle-based. Another factor leading to muscle deformation is tissue perturbations due to motion (e.g., fat wiggling).

The model can be extended to encompass a distribution that models which human poses are likely, in a modular way. For example, in the case of static scans, a kinematic prior such as that of Popovic et al. [2004] could simply be introduced as an additional term into our optimization. When animating dynamic sequences, we can add a tracking algorithm (e.g., a Kalman filter) to generate a pose prior for any frame given all or part of the observation sequence.

Another method for optimizing Eq. (10) can be obtained by observing that the equation features both the absolute rigid part rotations R, and the relative joint rotations Δr in the same product. These entities are correlated, since changing the absolute rotations also changes the joint angles. The optimization scheme described above ignores the effect of this correlation, and solves directly for the absolute rotations while assuming the angles get preserved. The key to avoiding this approximation is to use only the relative joint rotations.

A different optimization method takes advantage of the fact that the articulated model is tree-structured. Then, we can pick one of the parts as a root, and represent absolute rotations in terms of a sequence of joint angle rotations. This is a standard method known as kinematic-chain rotation representation. When all rotation terms for both R and Δr in Eq. (10) are represented in terms of joint angle rotations, we can iterate by solving for the rotation of each joint one by one. This is done by making a first order approximation around the current joint rotation value and solving the resulting least-squares problem. The optimization steps for the remaining quantities remain unchanged.

All such variations are considered to be within the scope and spirit of the present invention as defined by the following claims and their legal equivalents.

References

ALLEN, B., CURLESS, B., AND POPOVIC, Z. 2002. Articulated body deformation from range scan data. *ACM Transactions on Graphics*, 21(3), 612-619.

ALLEN, B., CURLESS, B., AND POPOVIC, Z. 2003. The space of human body shapes: reconstruction and parameterization from range scans. *ACM Transactions on Graphics*, 22(3), 587-594.

ANGUELOV, D., KOLLER, D., PANG, H., SRINIVASAN, P., AND THRUN, S. 2004. Recovering articulated object models from 3d range data. In *Proceedings of the 20th conference on Uncertainty in artificial intelligence*, 18-26.

ANGUELOV, D., SRINIVASAN, P., KOLLER, D., THRUN, S., PANG, H., AND DAVIS, J. 2005. The correlated correspondence algorithm for unsupervised registration of nonrigid surfaces. In *Advances in Neural Information Processing Systems* 17, 33-40.

CHEUNG, K. M., BAKER, S., AND KANADE, T. 2003. Shape-from silhouette of articulated objects and its use for human body kinematics estimation and motion capture. In *Conference on Computer Vision and Pattern Recognition (CVPR)*, 77-84.

CURLESS, B., AND LEVOY, M. 1996. A volumetric method of building complex models from range images. *Proceedings of SIGGRAPH* 1996, 303-312.

DAVIS, J., MARSCHNER, S., GARR, M., AND LEVOY, M. 2002. Filling holes in complex surfaces using volumetric diffusion. In *Symposium on 3D Data Processing, Visualization, and Transmission*.

GARLAND, M., AND HECKBERT, P. S. 1997. Surface simplification using quadric error metrics. In *Proceedings of SIGGRAPH* 97, 209-216.

HAHNEL, D., THRUN, S., AND BURGARD, W. 2003. An extension of the ICP algorithm for modeling nonrigid objects with mobile robots. In *Proceedings of the International Joint Conference on Artificial Intelligence (IJCAI)*.

HILTON, A., STARCK, J., AND COLLINS, G. 2002. From 3d shape capture to animated models. In *First International Symposion on 3D Data Processing, Visualization and Transmission (3D VPT2002)*.

KAHLER, K., HABER, J., YAMAUCHI, H., AND SEIDEL, H.-P. 2002. Head shop: generating animated head models with anatomical structure. In *ACM SIGGRAPH Symposium on Computer Animation*, 55-64.

LEWIS, J. P., CORDNER, M., AND FONG, N. 2000. Pose space deformation: a unified approach to shape interpolation and skeleton-driven deformation. *Proceedings of ACM SIGGRAPH* 2000, 165-172.

LIEPA, P. 2003. Filling holes in meshes. In *Proc. of the Eurographics/ACM SIGGRAPH symposium on Geometry processing*, 200-205.

MA, Y., SOATTO, S., KOSECKA, J., AND SASTRY, S. 2004. *An Invitation to 3D Vision*. Springer Verlag, 15-28.

MOHR, A., AND GLEICHER, M. 2003. Building efficient, accurate character skins from examples. *ACM Transactions on Graphics*, 22(3), 562-568.

NOH, J., AND NEUMANN, U. 2001. Expression cloning. *Proceedings of ACM SIGGRAPH* 2001, 277-288.

POPOVIC, Z., GROCHOW, K., MARTIN, S. L., AND HERTZMANN, A. 2004. Style-based inverse kinematics. *ACM Transactions on Graphics*, 23(3), 522-531.

SAND, P., MCMILLAN, L., AND POPOVI'C, J. 2003. Continuous capture of skin deformation. *ACM Transactions on Graphics*, 22(3), 578-586.

SCHÖLKOPF B. AND ALEX SMOLA, 1998. A tutorial on support vector regression. In *Technical Report NC2-TR-1998-030*. NeuroCOLT2.

SEO, H., AND MAGNENAT-THALMANN, N. 2003. An automatic modeling of human bodies from sizing parameters. In *ACM Symposium on Interactive 3D Graphics*, 19-26.

SLOAN, P.-P. J., ROSE, C. F., AND COHEN, M. F. 2001. Shape by example. In 2001 *Symposium on Interactive 3D Graphics*, 135-144.

SUMNER, R. W., AND POPOVI'C, J. 2004. Deformation transfer for triangle meshes. *Proceedings of ACM SIGGRAPH* 2004, 23(3), 399-405.

SZELISKI, R., AND LAVALLEE, S. 1996. Matching 3-d anatomical surfaces with non-rigid deformations using octree-splines. *International Journal of Computer Vision* 18, 2, 171-186.

VASILESCU, M., AND TERZOPOULOS, D. 2002. Multilinear analysis of image ensembles: Tensorfaces. In *European Conference on Computer Vision (ECCV)*, 447-460.

VLASIC, D., PFISTER, H., BRAND, M., AND POPOVI'C, J. 2004. Multilinear models for facial synthesis. In *SIGGRAPH Research Sketch*.

WANG, X. C., AND PHILLIPS, C. 2002. Multi-weight enveloping: least squares approximation techniques for skin animation. In *ACM SIGGRAPH Symposium on Computer Animation*, 129-138.

What is claimed is:

1. A shape completion method, comprising:
   (a) using a processing pipeline to learn a pose deformation space model for a template mesh from a first three-dimensional example data set of pose mesh instances, said learnt pose deformation space model encoding variability in said template mesh with pose;
   (b) using said processing pipeline to learn a body shape deformation space model for a template mesh from a second three-dimensional example data set of body shape mesh instances, said learnt body shape deformation space model encoding variability in said template mesh with body shape;
   (c) using said processing pipeline to generate a partial mesh using the learnt pose deformation space model and said learnt body shape deformation space model based upon a provided pose and a provided body shape description; and (d) using said processing pipeline to complete said partial by generating a complete three-dimensional surface that fits said partial mesh.

2. The method as set forth in claim 1, wherein at least one of said pose deformation space model or body shape deformation space model is a polygon deformation space model.

3. The method as set forth in claim 1, wherein both said pose deformation space model and body shape deformation space model are each a polygon deformation space model.

4. The method as set forth in claim 1, wherein said generated pose and shape are different from said pose and shape in said first and second example data set.

5. The method as set forth in claim 1, wherein said pose deformation space model derives non-rigid deformation as a function of the pose of an articulated skeleton.

6. A method of generating a mesh for a posed 3D character skeleton using a pose model generated from a set of pose mesh instances registered with respect to a template mesh and a decoupled body shape model generated from a set of body shape mesh instances registered with respect to the template mesh, wherein said template mesh has an associated articulated object skeleton, comprising:
(a) providing to a processing pipeline said pose model, said body shape model, said template mesh and said articulated object skeleton;
(b) providing to said processing pipeline a pose for said articulated object skeleton;
(c) posing said articulated object skeleton by rotating rigid parts of said articulated object skeleton based upon said provided pose;
(d) using said processing pipeline to automatically synthesize a mesh for said pose by deforming said template mesh based upon said pose model, and said posed articulated object skeleton;
(e) providing to said processing pipeline a body shape description;
(f) using said processing pipeline to automatically deform said synthesized mesh based upon said body shape model and said provided body shape description; and
(g) said processing pipeline outputting said deformed mesh.

7. The method as set forth in claim 6, wherein said template mesh is defined as a set of polygons, each with a set of vertices.

8. The method as set forth in claim 7, wherein said polygons are triangles.

9. The method as set forth in claim 6, wherein said provided pose comprises information indicative of a vector of rotations for said rigid parts of the articulated object skeleton.

10. The method as set forth in claim 9, wherein said pose model defines localized transformations for at least a plurality of said polygons in said template mesh based upon joint angle rotations of said articulated object skeleton in said provided pose.

11. The method as set forth in claim 10, wherein each localized transformation is applied to said edges of a polygon in said template mesh and said applied transformation is a function of said joint angle rotation of said joints in said articulated object skeleton closest to said polygon.

12. The method as set forth in claim 11, wherein said applied transformations are a function of said joint angle rotation of said two joints in said articulated object skeleton closest to said polygon.

13. The method as set forth in claim 11, wherein said localized transformations are linear transformations.

14. The method as set forth in claim 11, wherein said pose model is defined using a set of regression parameters that define the localized transformations applied to edges of polygons in the template mesh in terms of the joint angle rotation in the provided pose of the joints in the articulated object model closest to the polygon.

15. The method as set forth in claim 14, wherein said set of regression parameters define localized transformations that closely match said deformations observed in said pose mesh instances.

16. The method as set forth in claim 14, wherein said set of regression parameters define localized transformations that closely match the deformations observed in said pose mesh instances subject to a smoothness constraint.

17. The method as set forth in claim 16, wherein said smoothness constraint prefers similar deformations in adjacent polygons that belong to said same rigid part of said articulated object model.

18. The method as set forth in claim 15, wherein said set of regression parameters is determined from said set of pose mesh instances using linear regression.

19. The method as set forth in claim 15, wherein said set of regression parameters is determined from said set of pose mesh instances using non-linear regression.

20. The method as set forth in claim 10, wherein said pose model allows for arbitrary local deformations.

21. The method as set forth in claim 10, further comprising using said processing pipeline applying localized transformations to said polygons in said template mesh based upon said joint angle rotations of said articulated object skeleton in said provided pose.

22. The method as set forth in claim 21, wherein each of said localized transformations is applied to said edges of a polygon in said template mesh and is a function of said joint angle rotations of said joints in said articulated object skeleton closest to said polygon.

23. The method as set forth in claim 22, wherein at least one of said applied localized transformations is a function of said joint angle rotation of said two joints in said articulated object skeleton closest to said polygon.

24. The method as set forth in claim 6, wherein said body shape model defines localized transformations for said at least a plurality of said polygons of said template mesh based upon said provided body shape description.

25. The method as set forth in claim 24, wherein:
(i) the body shape model defines a set of principal component analysis (PCA) parameters that define localized transformations applied to said edges of polygons in said template mesh based upon a set of body shape parameters; and
(ii) said body shape description comprises information indicative of a set of body shape parameters.

26. The method as set forth in claim 24, wherein said localized transformations defined by said PCA parameters are linear transformations.

27. The method as set forth in claim 26, wherein said PCA parameters define localized transformations that closely match said deformations observed in said body shape mesh instances.

28. The method as set forth in claim 27, wherein said PCA parameters define localized transformations that closely match said deformations observed in said body shape mesh instances subject to a smoothness constraint.

29. The method as set forth in claim 28, wherein said smoothness constraint prefers similar deformations in adjacent polygons that belong to said same rigid part of the articulated object skeleton.

30. The method as set forth in claim 24, further comprising using said processing pipeline applying localized transformations to polygons in said synthesized mesh based upon said provided body shape description.

31. The method as set forth in claim 30, wherein:
(i) said body shape model includes a set of principal component analysis parameters that define said localized transformations applied to said edges of polygons in said synthesized mesh based upon a set of body shape parameters; and
(ii) said body shape description comprises information indicative of a set of body shape parameters.

32. The method as set forth in claim 6, wherein said deformed mesh is not a complete mesh, the method further comprising completing said deformed mesh using said processing pipeline by selecting a completed mesh based upon said provided pose and said provided body shape description that closely matches said partial deformed mesh.

33. The method as set forth in claim 6, wherein said mesh that is output includes representations of muscular deformations associated with said provided pose.

34. A method of generating a mesh for a posed 3D character skeleton using a pose model generated from a set of pose mesh instances registered with respect to a template mesh and a decoupled body shape model generated from a set of body shape mesh instances registered with respect to the template mesh, wherein said template mesh is defined as a set of polygons, said template mesh has an associated articulated object skeleton and said body shape model includes a set of principal component analysis (PCA) parameters that define localized transformations applied to edges of polygons in said template mesh based upon a set of body shape parameters, comprising:

(a) providing to a processing pipeline said pose model, said body shape model, said template mesh and said articulated object skeleton;
(b) providing to said processing pipeline a pose for said articulated object skeleton;
(c) rotating rigid parts of said articulated object skeleton based upon said provided pose;
(d) using said processing pipeline to automatically synthesize a mesh for said pose by applying localized transformations to polygons in said template mesh based upon said joint angle rotations of said articulated object skeleton in said provided pose, wherein each of said localized transformations is applied to said edges of a polygon in said template mesh and is a function of said joint angle rotations of said joints in said articulated object skeleton closest to said polygon;
(e) providing to said processing pipeline a body shape description, wherein said body shape description comprises information indicative of a set of body shape parameters;
(f) using said processing pipeline to automatically deform said synthesized mesh by applying localized transformations to polygons in said synthesized mesh based upon the transformations defined by said PCA parameters defined in said body shape model and said set of body shape parameters; and
(g) said processing pipeline outputting said deformed mesh, wherein said outputted mesh includes representations of muscular deformations associated with said provided pose.

35. The method as set forth in claim 34, wherein at least one of said applied localized transformations is a function of said joint angle rotation of said two joints in said articulated object skeleton closest to said polygon.

* * * * *